US012585658B1

(12) United States Patent　　　(10) Patent No.:　US 12,585,658 B1
McCartney, Jr.　　　　　　　　(45) Date of Patent:　　Mar. 24, 2026

(54) GENERATING AUGMENTED OUTPUT SEQUENCES BY A NEURAL NETWORK USING EXTERNAL DATABASES

(71) Applicant: Google LLC, Mountain View, CA (US)

(72) Inventor: Terrance Paul McCartney, Jr., Allison Park, PA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/593,738

(22) Filed: Mar. 1, 2024

(51) Int. Cl.
　　*G06F 16/00*　　　(2019.01)
　　*G06F 16/242*　　(2019.01)
　　*G06F 16/2457*　　(2019.01)
　　*G06F 40/40*　　　(2020.01)
(52) U.S. Cl.
　　CPC .... *G06F 16/24573* (2019.01); *G06F 16/2438* (2019.01); *G06F 40/40* (2020.01)
(58) Field of Classification Search
　　CPC . G06F 16/24573; G06F 16/2438; G06F 40/40
　　USPC ........................................................ 707/722
　　See application file for complete search history.

(56) References Cited

U.S. PATENT DOCUMENTS

| | | | | | |
|---|---|---|---|---|---|
| 8,645,408 | B2 * | 2/2014 | Chowdhury | ........ | H04L 65/1101 707/769 |
| 8,965,763 | B1 * | 2/2015 | Chelba | .................. | G10L 15/063 704/235 |
| 11,003,865 | B1 * | 5/2021 | Lee | ........................ | G06N 3/045 |
| 11,232,155 | B2 * | 1/2022 | Ni | ........................ | G06F 16/3334 |
| 11,676,582 | B2 * | 6/2023 | Nowak-Przygodzki | ..................... G06F 16/909 704/270.1 |
| 12,111,859 | B2 * | 10/2024 | Siebel | ..................... | G06F 40/40 |
| 2008/0040321 | A1 * | 2/2008 | Baeza-Yates | ....... | G06F 16/2477 |
| 2018/0082184 | A1 | 3/2018 | Guo et al. | | |
| 2020/0105257 | A1 | 4/2020 | Kwatra et al. | | |
| 2020/0111014 | A1 | 4/2020 | Myslinski | | |
| 2021/0097982 | A1 * | 4/2021 | Nowak-Przygodzki | ..................... G10L 15/22 |
| 2021/0295822 | A1 * | 9/2021 | Tomkins | ............. | G06F 16/3338 |
| 2022/0006761 | A1 | 1/2022 | Magliozzi et al. | | |
| 2022/0188661 | A1 | 6/2022 | Tappin | | |
| 2022/0198144 | A1 * | 6/2022 | Yang | ..................... | G06N 20/00 |
| 2023/0135179 | A1 | 5/2023 | Mielke et al. | | |
| 2023/0176829 | A1 * | 6/2023 | Rahmani | ................ | G06F 40/40 717/110 |

OTHER PUBLICATIONS

Adiwardana et al., "Towards a human-like open-domain chatbot," CoRR, Submitted on Feb. 27, 2020, arXiv:2001.09977v3, 38 pages.
Brown et al., "Language models are few-shot learners," CoRR, Submitted on Jul. 22, 2020, arXiv:2005.14165v4, 75 pages.
Raffel et al., "Exploring the limits of transfer learning with a unified text-to-text transformer," CoRR, Submitted on Oct. 24, 2019, arXiv:1910.10683v2, 53 pages.

(Continued)

*Primary Examiner* — Monica M Pyo
(74) *Attorney, Agent, or Firm* — Fish & Richardson P.C.

(57)　　　　　　ABSTRACT

Methods, systems, and apparatus, including computer programs encoded on a computer storage medium, for generating augmented output sequences by using a language model neural network and a plurality of databases. Each database is associated with a respective level of confidence. Each database stores a respective plurality of pre-generated embeddings in an embedding space.

20 Claims, 3 Drawing Sheets

(56) References Cited

OTHER PUBLICATIONS theverge.com [online], "Google's AI chatbot Bard makes factual error in first demo," Feb. 8, 2023, retrieved on Mar. 13, 2025, retrieved from URL <https://www.theverge.com/2023/2/8/23590864/google-ai-chatbot-bard-mistake-error-exoplanet-demo>, 9 pages.
wikipedia.org [online], "k-d tree," Feb. 28, 2023, retrieved on Mar. 18, 2025, retrieved from URL <https://en.wikipedia.org/w/index.php?title=K-d_tree&oldid=1142002841>, 9 pages.
wikipedia.org [online], "Sentence embedding," Jun. 22, 2024, retrieved on Mar. 18, 2025, retrieved from URL <https://en.wikipedia.org/w/index.php?title=Sentence_embedding&oldid=1230393705>, 3 pages.

* cited by examiner

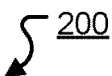

200

```
┌─────────────────────────────────────────────────────┐
│         Maintain a plurality of databases            │
│                        202                           │
└─────────────────────────────────────────────────────┘
                          │
                          ▼
┌─────────────────────────────────────────────────────┐
│  Generate an initial output by using a language      │
│           model neural network                       │
│                        204                           │
└─────────────────────────────────────────────────────┘
                          │
                          ▼
┌─────────────────────────────────────────────────────┐
│   Determine a confidence score for each subsequence  │
│                        206                           │
│  ┌───────────────────────────────────────────────┐  │
│  │          Generate a query embedding           │  │
│  │                      208                       │  │
│  └───────────────────────────────────────────────┘  │
│                          │                           │
│                          ▼                           │
│  ┌───────────────────────────────────────────────┐  │
│  │   Identify one or more pre-generated text      │  │
│  │               embeddings                       │  │
│  │                      210                       │  │
│  └───────────────────────────────────────────────┘  │
│                          │                           │
│                          ▼                           │
│  ┌───────────────────────────────────────────────┐  │
│  │   Compute the confidence score for the         │  │
│  │               subsequence                      │  │
│  │                      212                       │  │
│  └───────────────────────────────────────────────┘  │
└─────────────────────────────────────────────────────┘
                          │
                          ▼
┌─────────────────────────────────────────────────────┐
│        Generate an augmented output sequence         │
│                        214                           │
└─────────────────────────────────────────────────────┘
```

FIG. 2

GENERATING AUGMENTED OUTPUT SEQUENCES BY A NEURAL NETWORK USING EXTERNAL DATABASES

BACKGROUND

This specification relates to generating an output in response to an input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some interactive software applications (which may be referred to as "automated assistants," "digital agents," "chat-bots," "interactive personal assistants," "intelligent personal assistants," "conversational agents," etc.) implement neural networks to generate textual outputs in response to inputs, e.g., requests and/or prompts, received from humans (which, when they interact with the interactive software applications may be referred to as "users").

SUMMARY

This specification describes a system implemented as computer programs on one or more computers in one or more locations that generates an augmented output sequence by using a language model neural network to generate an initial output sequence and then modifying, as a result of evaluating the initial output sequence by using a plurality of external databases, the initial output sequence to generate the augmented output sequence. The augmented output sequence has a greater likelihood to be factually accurate than the initial output sequence, and is thus more suitable for providing as the output of the system in response to a given request.

Particular embodiments of the subject matter described in this specification can be implemented so as to realize one or more of the following advantages.

An augmented output sequence generation system as described in this specification can generate augmented output sequences in response to input sequences based on using a language model neural network and on the content stored in multiple databases external to the language model neural network. The multiple external databases store embeddings generated from different collections of electronic documents that are associated with different levels of confidence and that are used in an augmentation process to improve the quality of the initial output sequences generated by the language model neural network. As a result of the augmentation process, the initial output sequences can be augmented to generate the augmented output sequences that account for, e.g., mitigate or alleviate, any factual incorrectness that might occur in the initial output sequences.

Thus, the augmented output sequences generated by the system are more likely to be factually accurate than output sequences generated using a language model neural network without performing a subsequent augmentation process. The augmented output sequence generation system described in this specification is thus suitable for deployment at production environments such as within an educational or medical organization in which false or misleading information may result in serious consequences.

In particular, by generating an initial output sequence using the language model neural network followed by an augmentation process that uses the multiple external databases to augment the initial output sequence, the described system improves the quality of the generated output sequences without having to retrain the language model neural network and thus avoids additional processing resource and power consumption that is otherwise required for retraining the neural network to improve the quality of its output sequences. Moreover, the system can augment the initial output sequences without needing to have access to any underlying details of the language model neural network, e.g., the architecture, the weights, or both of the neural network that generates the initial output sequences, allowing the described techniques to be applied across a wide variety of different language model neural networks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for generating an augmented output sequence.

Like reference numbers and designations in the various drawings indicate like elements.

DETAILED DESCRIPTION

Figure 1:
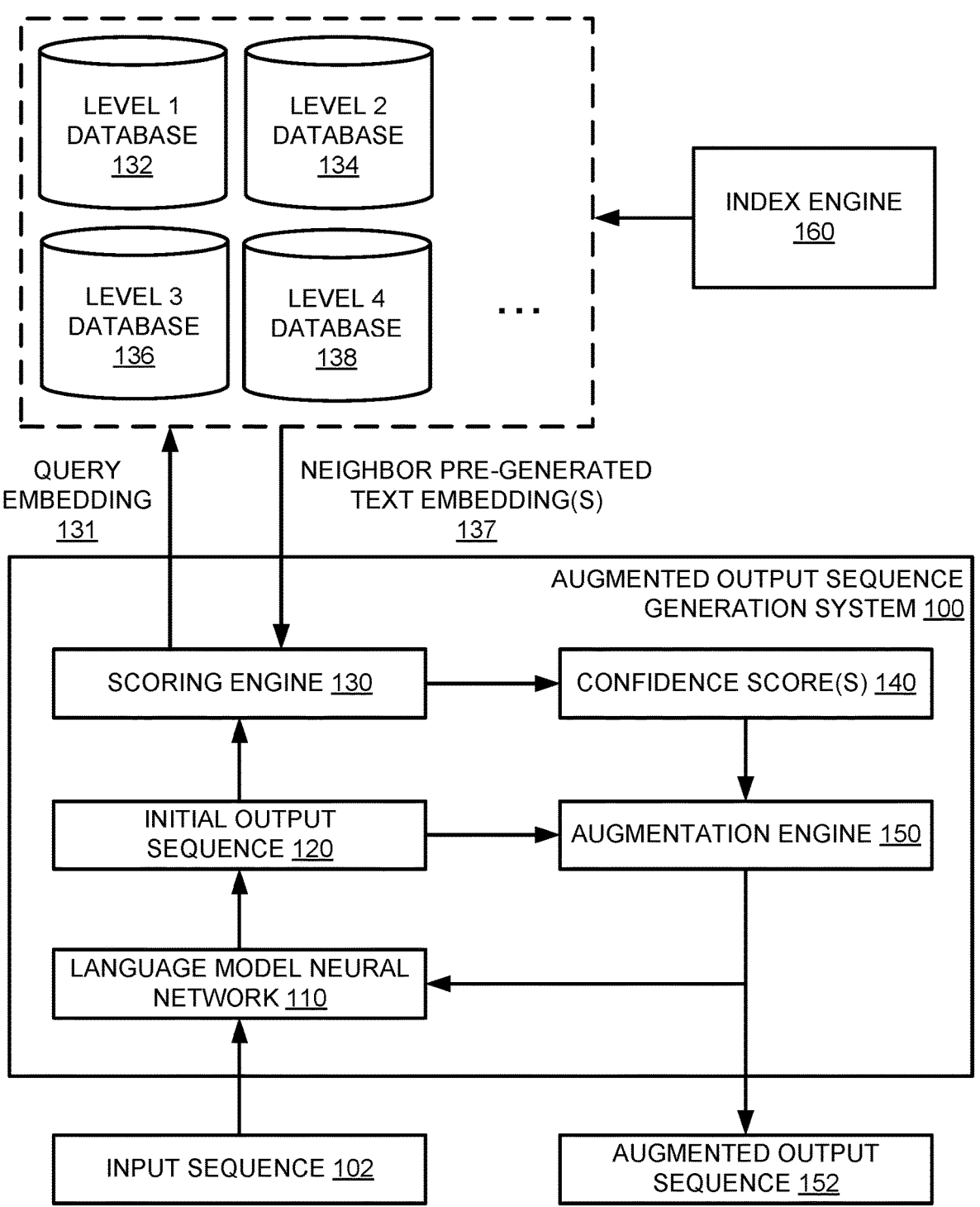
FIG. 1 shows an example augmented output sequence generation system.

FIG. 1 shows an example augmented output sequence generation system 100 (referred to below as the "system" 100 for short). The system 100 is an example of a system implemented as computer programs on one or more computers in one or more locations that generates an augmented output sequence 152 from an input sequence 102.

In some implementations, the system 100 is part of a text generation system that generates text sequences, i.e., each augmented output sequence 152 generated by the system 100 is a sequence of text tokens from a vocabulary of text tokens that includes, e.g., one or more of characters, sub-words, words, punctuation marks, numbers, or other symbols that appear in natural language text. For example, the system 100 can generate text sequences in response to received requests and provide the text sequences for presentation to users, e.g., on a display of a client device of a user.

The input sequence 102 can be a query submitted to the system 100 by a user through the client device, a question submitted to the system 100 by through the client device, or a different request that requires a response from the system 100. In some cases, the system 100 receives the query as text from the client device. In some cases, the system 100 receives the query as part of a multi-model input from the client device. In general, a multi-modal input is a combination of two or more different types of data, e.g., two or more of text data, audio data, image data, or graph data. As one example the multi-modal input may comprise a combination of i) text data representing text in a natural language and ii) pixels of an image or of video or audio data representing values of an audio waveform. In some other cases, the system 100 receives a natural language speech query from the user and converts the speech into the input sequence 102 by applying a speech recognition engine to the speech. The input sequence 102 may be received in the form of a sound (speech) signal, captured by a microphone of the client device, which is converted by a speech recognition engine, i.e., a speech-to-text converter to form the input sequence 102. Alternatively, it may be entered by typing using a data input device of the client device.

Once the system 100 receives the input sequence 102, the system 100 processes the input sequence 102 using a language model neural network 110 to generate an initial output sequence 120 that includes a sequence of tokens.

The language model neural network 110 can be any appropriate language model neural network that receives an input sequence 102 made up of tokens selected from a vocabulary and auto-regressively generates an initial output sequence 120 made up of tokens from the vocabulary. For example, the language model neural network 110 can be a Transformer-based language model neural network or a recurrent neural network-based language model. The tokens in the vocabulary can be any appropriate text tokens, e.g., words, word pieces, punctuation marks, and so on, that represent elements of text in one or more natural languages and, optionally, numbers and other text symbols that are found in a corpus of text.

The language model neural network 110 is referred to as an auto-regressive neural network because the language model neural network 110 auto-regressively generates an initial output sequence of tokens by generating each particular token in the initial output sequence 120 conditioned on a current input sequence that includes any tokens that precede the particular text token in the initial output sequence, i.e., the tokens that have for already been generated for any previous positions in the initial output sequence that precede the particular position of the particular token.

More specifically, to generate a particular token at a particular position within the initial output sequence, the language model neural network 110 can process the current input sequence to generate a score distribution, e.g., a probability distribution, that assigns a respective score, e.g., a respective probability, to each token in the vocabulary of tokens. The language model neural network 110 can then select, as the particular token, a token from the vocabulary using the score distribution. For example, the neural network 110 can greedily select the highest-scoring token or can sample, e.g., using nucleus sampling or another sampling technique, a token from the distribution.

As a particular example, the language model neural network 110 can be an auto-regressive Transformer-based neural network that includes (i) a plurality of attention blocks that each apply a self-attention operation and (ii) an output subnetwork that processes an output of the last attention block to generate the score distribution.

The language model neural network 110 can have any of a variety of Transformer-based neural network architectures. Examples of such architectures include those described in Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neclakantan, Pranav Shyam, Girish Sastry, Amanda Askell, et al. Language models are few-shot learners. arXiv preprint arXiv: 2005.14165, 2020.

Generally, however, the Transformer-based neural network includes a sequence of attention blocks, and, during the processing of a given input sequence, each attention block in the sequence receives a respective input hidden state for each input token in the given input sequence. The attention block then updates each of some or all of the hidden states at least in part by applying self-attention to generate a respective output hidden state for each of the input tokens. The input hidden states for the first attention block are embeddings of the input tokens in the input sequence and the input hidden states for each subsequent attention block are the output hidden states generated by the preceding attention block.

In this example, the output subnetwork processes the output hidden state generated by the last attention block in the sequence for the last input token in the input sequence to generate the score distribution.

In some implementations, the system 100 or another training system pre-trains the language model neural network 110 on a language modeling task, e.g., a task that requires predicting, given a current sequence of text tokens, the next token that follows the current sequence in the training data. As a particular example, the language model neural network 110 can be pre-trained on a maximum-likelihood objective on a large dataset of text, e.g., text that is publicly available from the Internet or another text corpus.

When the initial output sequence 120 is generated, the system 100 determines whether the initial output sequence 120 is suitable for providing to the user in response to submitting the input sequence 102. In particular, the system 100 uses a scoring engine 130 to determine a likelihood that the initial output sequence 120 includes any factually incorrect, misleading, or otherwise nonsensical information. The scoring engine 130 can be configured to do this on the granularity of subsequences. Each subsequence includes a respective subset of the sequence of tokens included in the initial output sequence 120 generated by the language model neural network 110.

If the scoring engine 130 determines that the likelihood that the initial output sequence 120 includes any such information is lower than a threshold likelihood, then the system 100 provides the initial output sequence 120 as the augmented output sequence 152 for presentation to the user in response to receiving the input sequence 102.

Alternatively, if the scoring engine 130 determines that the likelihood that the initial output sequence 120 includes factually incorrect, misleading, or otherwise nonsensical information is higher than the threshold likelihood, then the system 100 uses an augmentation engine 150 to augment, e.g., apply a modification or correction to, the initial output sequence 120 to generate an augmented output sequence 152 that is subsequently provided for presentation to the user in response to receiving the input sequence 102.

Optionally, if the scoring engine 130 determines that the likelihood that the initial output sequence 120 includes factually incorrect, misleading, or otherwise nonsensical information is higher than the threshold likelihood, some implementations of the system 100 simply rejects the input sequence 102 based on which the initial output sequence 120 is generated, and instead provide a default output to the user indicating that the system cannot respond to their query.

Such a determination can be made based on confidence scores 140 generated for the initial output sequence 120. The scoring engine 130 can generate a confidence score 140 for each of one or more subsequences included in the initial output sequence 120. Each subsequence includes a respective subset of the sequence of tokens included in the initial output sequence 120 generated by the language model neural network 110.

In some implementations, each subsequence can include the same number of tokens as another subsequence, while in other implementations, different subsequences can include different numbers of tokens. For each subsequence, the confidence score 140 generally indicates a level of confidence, e.g., confidence of the accuracy, of information represented by the subsequence.

In some implementations, the system 100 can provide the confidence scores 140 alongside the augmented output sequence 152 for presentation to the user. In some implementations, the system 100 presents the augmented output sequence 152 with visual indications of the confidence scores 140. For example, the augmented output sequence 152 can be color coded, i.e., different subsequences are presented in potentially different colors, where different colors indicate different confidence scores.

To generate the confidence scores 140, the scoring engine 130 accesses or interfaces with a plurality of databases that are each associated with a respective level of confidence. In some implementations, each database corresponds to a respective knowledge base external to the language model neural network 110, and is associated with a respective level of confidence with respect to the knowledge base corresponding to the database.

Although a total of four databases 132, 134, 136, 138 are shown in FIG. 1 for convenience, there can generally be any number of databases, e.g., two databases, five databases, ten databases, and so on, that correspond respectively to two knowledge bases, five knowledge bases, ten knowledge bases, and so on. Each knowledge base includes a collection of electronic documents. The collection of electronic documents may pertain to a particular domain of knowledge.

The particular domain of knowledge may be generic. An example of a knowledge base that has a generic domain is the Wikipedia collection available on the Internet in the wikipedia.org domain, which includes a collection of encyclopedia articles such as a collection of Wikipedia articles or other encyclopedic collection of text articles. Another example of a knowledge base that has a generic domain is a collection of electronic documents that is available on a blogging platform or a social media platform. A further example of a knowledge base that has a generic domain is a collection of newspaper and/or magazine articles that is published by a news organization.

Alternatively, the particular domain of knowledge may be specific. An example of a knowledge base that has a specific domain is a scholarly, academic, and/or peer-reviewed journal that includes a collection of text articles specific to a scientific, medical, engineering, financial or another technical field. Another example of a knowledge base that has a specific domain is a collection of electronic documents that is maintained by an official government organization, e.g., that is available on the Internet in a .gov domain.

Each database is associated with a respective level of confidence with respect to the knowledge base corresponding to the database. For example, in FIG. 1, the database 132 is associated with a first level of confidence, the database 134 is associated with a second level of confidence, the database 136 is associated with a third level of confidence, and the database 138 is associated with a fourth level of confidence. In some implementations, different databases are associated with different levels of confidence, while in other implementations, two or more databases are associated with the same level of confidence.

More specifically, each database stores a respective plurality of pre-generated embeddings in an embedding space that have been generated from source subsequences included in the collection of electronic documents in the knowledge base that corresponds to the database. Each source subsequence can be, for example, a paragraph, a sentence, or another string or strings of text. Generally, each source subsequence is also made up of tokens selected from the vocabulary.

Within each database, the plurality of embeddings can be pre-generated in any appropriate way. For example, they can be generated by the language model neural network 110 of FIG. 1 based on processing the source subsequences included in the collection of electronic documents in the knowledge base that corresponds to the database. As a particular example, they can be the output hidden states generated by an attention block included in the language model neural network 110, or more generally, any output hidden states generated by one or more intermediate layers of the language model neural network 110 based on processing the source subsequences. As another example, they can be generated in accordance with a predetermined mapping between each token included in the vocabulary and a corresponding embedding in the embedding space.

In some implementations, the collection of electronic documents in each knowledge base can be obtained by an index engine 160. The index engine 160 can be any appropriate index engine that is accessible by the system 100 and that crawls electronic documents (e.g., books, web pages (e.g., HTML pages), news articles, or other documents) that can be found in a corpus (e.g., a collection or repository of content) that is available on the Internet.

An electronic document (which for brevity will simply be referred to as a document) does not necessarily correspond to a file. A document may be stored in a portion of a file that holds other documents, in a single file dedicated to the document in question, or in multiple coordinated files.

For each database, the index engine 160 assigns a level of confidence to the database. Index data that defines the assigned level of confidence can then be stored in association with the plurality of pre-generated embeddings within the database. Put another way, each pre-generated embedding can be stored in association with corresponding index data that specifies the level of confidence of the database within which the pre-generated embedding is stored.

In some implementations, the index engine 160 can determine the level of confidence based on a known location of the knowledge base that corresponds to the database. For example, the location of a knowledge base is known when it is included in a predetermined list of knowledge base locations that is maintained by the system 100.

In other implementations, the location of a knowledge base may not be known to the index engine 160. The location of a knowledge base may be unknown for many reasons. For example, the knowledge base could be a new knowledge base, e.g., is relatively recently made publicly available.

In those implementations, the index engine 160 can determine a level of confidence of a database that corresponds to the knowledge base in an automatic manner based on determining a similarity measure between the pre-generated embeddings stored in the database and the pre-generated embeddings stored in one or more other databases the levels of confidence of which are already determined. This will be described in more detail in FIG. 3 below.

In some implementations, the corresponding index for each pre-generated embedding can specify additional information about the source subsequence based on which the pre-generated embedding is generated. Such additional information can generally include any contextual information about the source subsequence.

For example, for a given pre-generated embedding, the index can specify a network location of an electronic document from which the source subsequence is obtained, e.g., extracted. As another example, for a given pre-generated embedding, the index can specify a location offset of the source subsequence within an electronic document that includes the source subsequence. As yet another example, for a given pre-generated embedding, the index can specify a timestamp that an electronic document from which the source subsequence is obtained is last modified.

To generate the confidence score 140 for each of the one or more subsequences included in the initial output sequence 120, the scoring engine 130 generates a query embedding 131 for each subsequence, and then identifies one or more neighbor pre-generated text embeddings 137 from the databases 132, 134, 136, 138 using the query embedding 131.

Like the plurality of pre-generated embeddings stored in the databases, the query embedding 131 for each subsequence included in the initial output sequence 120 can be generated in any appropriate way. For example, the query embedding 131 can be the output hidden state of an intermediate layer in the language model neural network 110, or a combination of the output hidden states of two or more layers in the language model neural network 110, when the neural network is processing the input sequence 102 to generate the subsequence in the initial output sequence 120. As a particular example, the query embedding 131 can be the output hidden state generated by an attention block included in the language model neural network 110 of FIG. 1 when the neural network is processing the input sequence 102 to generate the subsequence in the initial output sequence 120.

Generally, identifying the one or more neighbor pre-generated text embeddings 137 can include computing, for each subsequence included in the initial output sequence 120, a respective distance between the query embedding 131 that has been generated for the subsequence and the plurality of pre-generated text embeddings included in each of the databases 132, 134, 136, 138, and then selecting one or more pre-generated text embeddings based on the respective distances, that is, selecting the one or more "neighbor pre-generated text embeddings 137." For example, the system 100 can select, as the neighbor pre-generated text embeddings 137, one or more pre-generated text embeddings that have the smallest distances to the query embedding 131 or that satisfy a distance threshold, and the distance can be, e.g., a Euclidean distance, a Hamming distance, or other type of distance in the embedding space.

After identifying the one or more neighbor pre-generated text embeddings 137, the scoring engine 130 can compute the confidence score for each subsequence. In particular, it does this based on the index data that is stored in association with the one or more neighbor pre-generated text embeddings 137.

For each subsequence, when only one neighbor pre-generated text embedding 137 is identified, the scoring engine 130 can compute the confidence score 140 for the subsequence based on the level of confidence specified by the index that is stored in association with the neighbor pre-generated text embedding 137. For example, there can be a one-to-one mapping between different levels of confidence and different confidence scores, and the scoring engine 130 can use the confidence score mapped to the level of confidence specified by the index as the confidence score 140 for the subsequence.

In some implementations, the scoring engine 130 can compute the confidence score 140 based on the additional information specified by the index that is stored in association with the neighbor pre-generated text embedding 137. For example, the confidence score can be lower when the neighbor pre-generated text embedding is generated based on a source subsequence included in an electronic document at a first network location, while the confidence score can be higher when the neighbor pre-generated text embedding is generated based on a source subsequence included in an electronic document at a second network location.

As another example, the confidence score can be higher when the neighbor pre-generated text embedding is generated based on a source subsequence at a first location within an electronic document, while the confidence score can be lower when the neighbor pre-generated text embedding is generated based on a source subsequence at a second location within the electronic document. For example, assuming that the electronic document is a web page, then the first location can be the body content of the web page, while the second location can be the chat forum that follows the body content of the web page.

As another example, the confidence score can be lower when the neighbor pre-generated text embedding is obtained from an electronic document that is relatively recently modified, while the confidence score can be higher when the neighbor pre-generated text embedding is obtained from an electronic document that hasn't been modified for a certain amount of time, or vice versa.

Alternatively, when multiple neighbor pre-generated text embeddings 137 are identified for each subsequence, the scoring engine 130 can compute the confidence score 140 for the subsequence based on the multiple indices that are respectively stored in association with the multiple neighbor pre-generated text embeddings 137.

For example, the confidence score 140 for the subsequence can be a combination of confidence scores that can be computed individually for each neighbor pre-generated text embedding based on the level of confidence, and, in some implementations, on the additional information specified by the corresponding index that is stored in association with the neighbor pre-generated text embedding (as mentioned earlier). For example, the scoring engine 130 can combine, e.g., average or sum, the confidences scores, and use the combined confidence score as the confidence score for the subsequence, or can alternatively use one of the confidence scores, e.g., the lowest or highest confidence score, as the confidence score 140 for the subsequence.

The scoring engine 130 uses the confidence scores 140 to determine whether the initial output sequence 120 is suitable for providing for presentation to the user. Generally, the scoring engine 130 makes this determination by comparing the confidence scores 140 that have been computed for the one or more subsequences included in the initial output sequence 120 against a predetermined threshold confidence score.

For example, the scoring engine 130 can determine that the initial output sequence 120 does not include any factually incorrect, misleading, or otherwise nonsensical information, and is thus suitable for presentation to the user as-is, when the confidence score 140 generated for each of the one or more subsequences included in the initial output sequence 120 satisfies the predetermined threshold confidence score.

Alternatively, the scoring engine 130 can determine that the initial output sequence 120 includes at least some information that is factually incorrect, misleading, and/or otherwise nonsensical, and is thus unsuitable for presentation to the user, when the confidence score 140 generated for at least one subsequence fails to satisfy the predetermined threshold confidence score.

When the scoring engine 130 determines that the confidence score for a particular subsequence fails to satisfy the predetermined threshold confidence score, the system 100 can use an augmentation engine 150 to modify the particular subsequence to generate a modified subsequence that accounts for, e.g., mitigates or alleviates, a lack of confidence of the information represented by the particular subsequence.

To that end, the augmentation engine 150 can be implemented in any of a variety of ways. In some implementations, it can be configured as a prompt engine that generates a prompt that, when processed by the language model neural network 110, will cause or encourage it to generate a replacement subsequence that is more likely to be factually accurate. That is, the same language model neural network 110 is then used to generate another output sequence for the same input sequence 102 that includes different information than the initial output sequence 120. An example of such a prompt can be "Your previous statement that [ . . . ] is factually inaccurate. Please generate another answer that is more factually accurate." In the example, the content within the brackets can be the particular subsequence that has a confidence score that fails to satisfy the confidence threshold.

In some of these implementations, the augmentation engine 150 provides the initial output sequence 120 (or the particular subsequence of the initial output sequence 120) and, optionally, the confidence scores 140, alongside the input sequence 102 as input to the language model neural network 110. In this way the language model neural network 110 is able to generate new output sentences conditioned on the previously generated output sequences, and, when provided, the confidence scores 140 that have been computed for these output sequences. This increase the likelihood that the new output sentences are more factually accurate.

In other implementations, the augmentation engine 150 can be configured as a text processing engine that can edit the initial output sequence 120 to generate an augmented output sequence 152. For example, the text processing engine can delete the particular subsequence from the initial output sequence 120, such that the augmented output sequence 152 includes no subsequences that have the confidence scores that fail to satisfy the predetermined threshold confidence score.

As another example, the text processing engine can generate a rephrasing of the particular subsequence for inclusion in the augmented output sequence 152 in place of the particular subsequence. The rephrasing generally accounts for the lack of confidence of the information represented by the particular subsequence. For example, such a rephrasing uses certain words to express a degree of uncertainly.

As yet another example, the text processing engine can add a textual indication to the particular subsequence to indicate to the user the potential lack of confidence with respect to the particular subsequence. For example, a textual indication that includes one of the following clauses can be prepended or appended to the particular subsequence within the initial output sequence 120: "There might be mistakes in this statement. Please double check the content for factual accuracy," or "I'm not sure about the factual accuracy about this statement," such that the augmented output sequence 152 includes the content of the initial output sequence 120, and also includes additional content that informs the user about the potential lack of confidence with respect to some of the content.

As a particular example for illustration, suppose that the system 100 receives an input sequence 102 that reads as follows: "Who were the survivors of the Titanic?" and uses the language model neural network 110 to generate an initial output sequence 120 that includes a total of three subsequences.

The first subsequence is: "Molly Brown is one of the famous passengers to survive the sinking of the Titanic." The second subsequence is: "J. Bruce Ismay managed to survive the sinking of the Titanic. He was the highest-ranked official in the White Star Line Company." The third subsequence is: "The sole survivor of the Titanic is Charles Joughin."

Each of these subsequences included in the initial output sequence 120 is coherent and grammatically correct, but the third subsequence is nevertheless factually incorrect, because about 700 passengers survived the sinking of Titanic.

In this example, the one or more neighbor pre-generated text embeddings 137 for the third subsequence that has been identified by the scoring engine 130 have corresponding indices that specify relatively lower levels of confidence, and, correspondingly, the confidence score 140 computed by the scoring engine 130 for the third subsequence based on the indices will not satisfy the predetermined threshold confidence score.

In response to determining that the confidence score 140 computed for the third subsequence does not satisfy the predetermined threshold confidence score, the system 100 uses the augmentation engine 150 to modify the third subsequence to generate an augmented output sequence 152.

For example, the third subsequence is deleted, and the augmented output sequence 152 does not include the third subsequence. As another example, a textual indication which informs the user about the potential lack of confidence is added, and the augmented output sequence 152 includes the first, second, and third subsequence, as well as the textual indication. In either example, the system 100 mitigates the negative effects that might be caused by the false or misleading information included in the initial output sequence 120 of the language model neural network 110 to improve system performance and user experience.

FIG. 2 is a flow diagram of an example process 200 for generating an augmented output sequence. For convenience, the process 200 will be described as being performed by a system of one or more computers located in one or more locations. For example, an augmented output sequence generation system, e.g., the augmented output sequence generation system 100 depicted in FIG. 1, appropriately programmed in accordance with this specification, can perform the process 200.

The system maintains a plurality of databases (step 202). Each database corresponds to an external knowledge base, and is associated with a respective level of confidence that is defined with respect to content of the knowledge base. The content of the external knowledge base includes a collection of electronic documents. Each electronic document includes a plurality of source subsequences. An example way of generating these databases is described below with reference to FIG. 3.

Each database stores a plurality of pre-generated embeddings that have been generated by using a neural network based on processing the source subsequences included in the collection of electronic documents in the knowledge base that corresponds to the database. In some implementations, the neural network can be the same as the neural network that is used below at step 204.

In particular, each database stores the plurality of pre-generated embeddings in association with index data that specifies the level of confidence of the database, and, in some implementations, additional contextual information about the source subsequences based on which the pre-generated embeddings are generated. For example, for a given pre-generated embedding, the index data can specify a network location of an electronic document from which the source subsequence is obtained, e.g., extracted. As another example, for a given pre-generated embedding, the index data can specify a location offset of the source subsequence within an electronic document that includes the source subsequence. As yet another example, for a given pre-generated embedding, the index data can specify a timestamp that an electronic document from which the source subsequence is obtained is last modified.

The system generates an initial output sequence by using a language model neural network (step 204). The initial output sequence can be generated by the language model neural network from processing an input sequence submitted by a user. The initial output sequence includes one or more subsequences.

For each of the one or more subsequences included in the initial output sequence, the system determines a confidence score that indicates a level of confidence of information represented by the subsequence (step 206). The system performs one iteration of following steps 208-212 to determine the confidence score for each subsequence.

The system generates a query embedding in the embedding space based on the subsequence (step 208). The query embedding can generally be derived from the output hidden states generated by one or more intermediate layers of the language model neural network while it is processing the input sequence to generate the subsequence in the initial output sequence.

In some implementations, the output hidden state of a layer of the language model neural network is directly used as the query embedding, while in other implementations, the output hidden state is further processed to generate the query embedding. For example, the system can apply a linear projection to the output hidden state using principal component analysis or another dimensionality reduction technique to reduce the dimensionality of the output hidden state. The projected output hidden state can then be used as the query embedding.

The system identifies, from the respective pluralities of pre-generated embeddings stored in the plurality of databases, one or more neighbor pre-generated text embeddings based on respective distances between the query embedding and each of the respective pluralities of pre-generated embeddings (step 210). For example, the system can select, as the neighbor pre-generated text embeddings, one or more pre-generated text embeddings that have the smallest distances to the query embedding or that satisfy a distance threshold.

In some implementations, this can be done by using a maximum inner product search technique (MIPS) to compute the inner product of the query embedding with the pre-generated text embeddings to identify pairs of query embedding and pre-generated text embedding that have the largest, or maximum, inner products (i.e., closest distance or, put another way, highest similarity).

When a large number of, e.g., one million, ten million, one billion, or more, pre-generated embeddings are stored in each database, however, computation of the inner products may be slow and processor resource intensive. Some implementations of the system thus use an approximate nearest neighbor matching technique, i.e., instead of a brute-force method, to enable faster computation time while retaining a high level of accuracy. For example, the system can use search space pruning, quantization for the MIPS, or both.

The system computes the confidence score for the subsequence based on the indices that are stored in association with the one or more neighbor pre-generated text embeddings (step 212). As mentioned above, the indices specify the levels of confidence of the databases that store the one or more neighbor pre-generated subsequences and, in some implementations, additional contextual information about the source subsequences based on which the neighbor pre-generated embedding are generated. Example ways of computing the confidence score based on the indices is described above with reference to FIG. 1.

The system determines that a particular subsequence in the one or more subsequences has a confidence score that fails to satisfy a predetermined threshold confidence score and, in response, generates an augmented output that modifies the particular subsequence (step 214). The system can make this determination by comparing the confidence scores that have been computed for each of the one or more subsequences against the predetermined threshold confidence score.

The system can generate the augmented output sequence by modifying the particular subsequence in any of a variety of ways. For example, the system can cause the language model neural network to generate a new output sequence, e.g., from processing a new prompt that includes the input sequence submitted by the user and the initial output sequence generated by the language model neural network. As another example, the augmented output sequence will include, in place of the particular subsequence, a rephrasing of the particular subsequence that accounts for a lack of confidence of the information represented by the particular subsequence. As another example, the augmented output sequence will exclude, i.e., will not include, the particular subsequence (but it may include the other subsequences included in the initial output sequence generated by the language model neural network that each satisfy the predetermined threshold confidence score).

After generating the augmented output sequence, the system can provide the augmented output sequence in response to the user who submitted the input sequence. For example, the system can provide the augmented output sequence to a client device of the user for presentation on a display of the client device.

Figure 3:
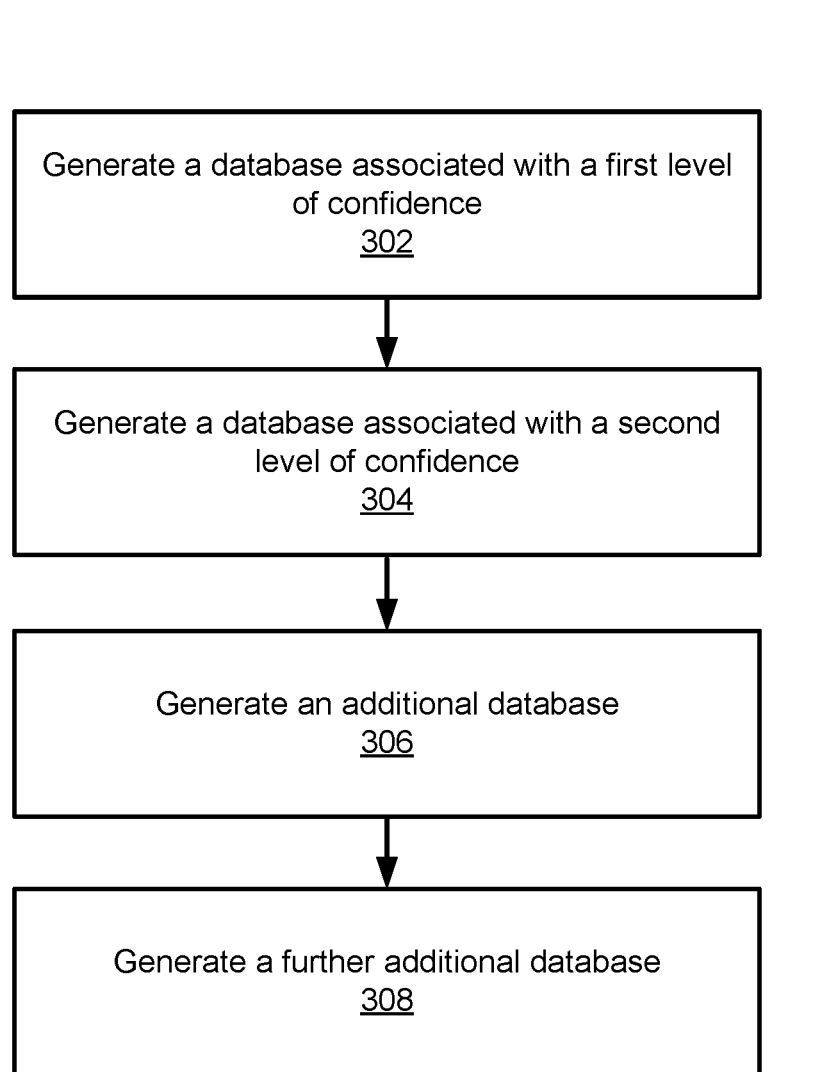
FIG. 3 is a flow diagram of an example process for generating a plurality of databases.

FIG. 3 is a flow diagram of an example process 300 generating a plurality of databases. For convenience, the process 300 will be described as being performed by a system of one or more computers located in one or more locations. For example, a neural network system, e.g., the neural network system 100 depicted in FIG. 1, appropriately programmed in accordance with this specification, can perform the process 300.

The system generates a database associated with a first level of confidence (step 302). The database stores a first plurality of pre-generated embeddings that have been generated, e.g., by using a neural network, from source subsequences extracted from electronic documents located at a first network location, e.g., a Uniform Resource Locator (URL) on the Internet. In particular, the first network location is known to the system, and the system associates the database with the first level of confidence at least partly because of the known, first network location.

In some implementations, the system generates an index for each of the first plurality of pre-generated embeddings that specifies the first level of confidence, and stores the indices in association with the plurality of pre-generated embeddings in the database associated with the first level of confidence.

The system generates a database associated with the second level of confidence (step 304). The database stores a second plurality of pre-generated embeddings that have been generated, e.g., by using the neural network, from source subsequences extracted from electronic documents located at a second network location, e.g., a URL on the Internet, that is different from the first network location. The second network location is also known to the system, and the system associates the database with the second level of confidence at least partly because of the known, second network location.

The system generates an additional database that stores a third plurality of pre-generated embeddings that have been generated, e.g., by using the neural network, from source subsequences extracted from electronic documents that is located at a third network location (step 306). The third network location is different from both the first and second network locations, and, in particular, unlike the first and second network locations, the third network location is unknown to system and therefore, the confidence of the content stored therein, is unknown to system.

To automatically determine the level of confidence for the additional database, the system determines (i) a first similarity of the third plurality of pre-generated embeddings relative to the first plurality of pre-generated embeddings and (ii) a second similarity of the third plurality of pre-generated embeddings relative to the second plurality of pre-generated embeddings, and associates the additional database with a corresponding level of confidence based on the first and second similarities.

In some implementations, the similarity can be computed as a distance in the embedding space, e.g., as a combination, e.g., sum or average, of the similarities between one or more pairs of third pre-generated embedding and first (or second) pre-generated embedding.

For example, if the first similarity is within a predetermined similarity threshold, then the corresponding level of confidence can be the first level of confidence (because the additional database stores pre-generated embeddings that are not too much different from the pre-generated embeddings stored in the database associated with the first level of confidence). Analogously, if the second similarity is within the predetermined similarity threshold, then the corresponding level of confidence can be the second level of confidence (because the additional database stores pre-generated embeddings that are not too much different from the pre-generated embeddings stored in the database associated with the second level of confidence).

As another example, if neither the first similarity nor the second similarity is within the predetermined similarity threshold, then the third level of confidence can be different from both the first and the second similarities. For example, the corresponding level of confidence can be in-between the first and the second levels of confidence.

The system can repeat step 306 until iterating through all of the databases. Each database stores a respective plurality of pre-generated embeddings that have been generated, e.g., by using the neural network, from source subsequences extracted from electronic documents located at a different network location. By repeatedly performing step 306 for each database, the system can determine the levels of confidence for all for all of the databases.

For example, the system can generate a further additional database that stores a fourth plurality of pre-generated embeddings that have been generated, e.g., by using the neural network, from source subsequences extracted from electronic documents that is located at a fourth network location (step 308).

For the further additional database, the system determines (i) a first similarity of the fourth plurality of pre-generated embeddings relative to the first plurality of pre-generated embeddings, (ii) a second similarity of the fourth plurality of pre-generated embeddings relative to the second plurality of pre-generated embeddings, and (iii) a third similarity of the fourth plurality of pre-generated embeddings relative to the third plurality of pre-generated embeddings.

The system then associates the further additional database with a corresponding level of confidence based on the first, second, and third similarities.

For example, when one of the first, second, and third similarities is within the predetermined similarity threshold, then the corresponding level of confidence of the further additional database can be same as one of the levels of confidence mentioned above.

Alternatively, when none of the first, second, and third similarities is within the predetermined similarity threshold, then the corresponding level of confidence can be different from any of the levels of confidence mentioned above, i.e., the corresponding level of confidence of the further additional database can be in-between the first and the third levels of confidence, or in-between the third and the second levels of confidence.

In this way, the system can automatically generate a large number of databases where each database corresponds to an external knowledge base, and is associated with a respective level of confidence that is defined with respect to content of the knowledge base. Generally, the greater the number of databases, the higher the likelihood that the system can generate an augmented output sequence that is factually accurate as a result of performing the process 200 which makes use of these databases.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   maintaining a plurality of databases that are each associated with a respective level of confidence, wherein each database stores a respective plurality of pre-generated embeddings in an embedding space that have been generated from source subsequences;
   generating an initial output sequence by using a language model neural network, the initial output sequence comprising one or more subsequences;
   for each of the one or more subsequences, determining a confidence score that indicates a level of confidence of information represented by the subsequence, wherein determining the confidence score comprises:
   generating, based on the subsequence included in the initial output sequence generated by using the language model neural network, a query embedding in the embedding space;
   searching through the plurality of databases to identify, from the respective pluralities of pre-generated embeddings stored in the plurality of databases, one or more similar pre-generated text embeddings, wherein the query embedding satisfies a distance criterion with each of the one or more similar pre-generated text embeddings; and
   computing the confidence score for the subsequence based on the levels of confidence associated with one or more of the plurality of databases that store the one or more similar pre-generated subsequences;
   identifying, from the one or more subsequences and based on the confidence scores determined for the one or more subsequences, a particular subsequence that has a particular confidence score, wherein the particular confidence score is determined based on a particular level of confidence associated with a particular database storing one or more similar pre-generated text embeddings that satisfy the distance criterion with a query embedding of the particular subsequence; and
   in response to identifying the particular subsequence, generating, based on the initial output sequence of the language model neural network, an augmented output sequence that modifies the initial output sequence to remove the particular subsequence initially generated by the language model neural network.

2. The method of claim 1, wherein identifying the particular subsequence that has the particular confidence score comprises:
   determining that the particular subsequence has the particular confidence score that fails to satisfy a confidence threshold.

3. The method of claim 2, wherein the augmented output sequence comprises a rephrasing of the particular subsequence that accounts for a lack of confidence of the information represented by the particular subsequence.

4. The method of claim 1, wherein each database stores the respective plurality of pre-generated embeddings in association with indices that specify the level of confidence of the database.

5. The method of claim 4, wherein the index specifies, for each of the respective plurality of pre-generated embeddings, (i) a network location of an electronic document that comprises a source subsequence based on which the pre-generated embeddings is generated, (ii) a location offset of the source subsequence within the electronic document, and (iii) a timestamp that the electronic document is last modified.

6. The method of claim 1, wherein the language model neural network comprises a Transformer neural network that has been trained on language modeling tasks.

7. The method of claim 1, further comprising providing the augmented output sequence to a client device for presentation on a display of the client device.

8. The method of claim 1, further comprising generating the plurality of databases based on:
   generating a first database associated with a first level of confidence, the first database storing a first plurality of pre-generated embeddings that have been generated from source subsequences extracted from electronic documents located at a first network location.

9. The method of claim 8, further comprising:

generating a second database associated with a second level of confidence that is lower than the first level of confidence, the second database storing a second plurality of pre-generated embeddings that have been generated from source subsequences extracted from electronic documents located at a second network location.

10. The method of claim 9, further comprising:

generating a third plurality of pre-generated embeddings from source subsequences extracted from electronic documents located at a third network location;

determining (i) a first similarity of the third plurality of pre-generated embeddings relative to the first plurality of pre-generated embeddings and (ii) a second similarity of the third plurality of pre-generated embeddings relative to the second plurality of pre-generated embeddings; and associating a third database that comprises the third plurality of pre-generated embeddings with a third level of confidence based on the first and second similarities.

11. The method of claim 10, wherein the third level of confidence is lower than the first level of confidence but higher than the second level of confidence.

12. The method of claim 1, wherein the augmented output sequence comprises a rephrasing of the particular subsequence that accounts for a lack of confidence of the information represented by the particular subsequence.

13. The method of claim 1, wherein the particular level of confidence associated with the particular database is a lowest level of confidence among the levels of confidence associated with one or more of the plurality of databases.

14. One or more non-transitory computer-readable storage media storing instructions that when executed by one or more computers cause the one or more computers to perform operations comprising:

maintaining a plurality of databases that are each associated with a respective level of confidence, wherein each database stores a respective plurality of pre-generated embeddings in an embedding space that have been generated from source subsequences;

generating an initial output sequence by using a language model neural network, the initial output sequence comprising one or more subsequences;

for each of the one or more subsequences, determining a confidence score that indicates a level of confidence of information represented by the subsequence, wherein determining the confidence score comprises:

generating, based on the subsequence included in the initial output sequence generated by using the language model neural network, a query embedding in the embedding space;

searching through the plurality of databases to identify, from the respective pluralities of pre-generated embeddings stored in the plurality of databases, one or more similar pre-generated text embeddings, wherein the query embedding satisfies a distance criterion with each of the one or more similar pre-generated text embeddings; and computing the confidence score for the subsequence based on the levels of confidence associated with one or more of the plurality of databases that store the one or more similar pre-generated subsequences;

identifying, from the one or more subsequences and based on the confidence scores determined for the one or more subsequences, a particular subsequence that has a particular confidence score, wherein the particular confidence score is determined based on a particular level of confidence associated with a particular database storing one or more similar pre-generated text embeddings that satisfy the distance criterion with a query embedding of the particular subsequence; and in response to identifying the particular subsequence, generating, based on the initial output sequence of the language model neural network, an augmented output sequence that modifies the initial output sequence to remove the particular subsequence initially generated by the language model neural network.

15. A system comprising one or more computers and one or more storage devices storing instructions that when executed by the one or more computers cause the one or more computers to perform operations comprising:

maintaining a plurality of databases that are each associated with a respective level of confidence, wherein each database stores a respective plurality of pre-generated embeddings in an embedding space that have been generated from source subsequences;

generating an initial output sequence by using a language model neural network, the initial output sequence comprising one or more subsequences;

for each of the one or more subsequences, determining a confidence score that indicates a level of confidence of information represented by the subsequence, wherein determining the confidence score comprises:

generating, based on the subsequence included in the initial output sequence generated by using the language model neural network, a query embedding in the embedding space;

searching through the plurality of databases to identify, from the respective pluralities of pre-generated embeddings stored in the plurality of databases, one or more similar pre-generated text embeddings, wherein the query embedding satisfies a distance criterion with each of the one or more similar pre-generated text embeddings; and computing the confidence score for the subsequence based on the levels of confidence associated with one or more of the plurality of databases that store the one or more similar pre-generated subsequences;

identifying, from the one or more subsequences and based on the confidence scores determined for the one or more subsequences, a particular subsequence that has a particular confidence score, wherein the particular confidence score is determined based on a particular level of confidence associated with a particular database storing one or more similar pre-generated text embeddings that satisfy the distance criterion with a query embedding of the particular subsequence; and in response to identifying the particular subsequence, generating, based on the initial output sequence of the language model neural network, an augmented output sequence that modifies the initial output sequence to remove the particular subsequence initially generated by the language model neural network.

16. The system of claim 15, wherein identifying the particular subsequence that has the particular confidence score comprises:

determining that the particular subsequence has the particular confidence score that fails to satisfy a confidence threshold.

17. The system of claim 16, wherein the augmented output sequence comprises a rephrasing of the particular subsequence that accounts for a lack of confidence of the information represented by the particular subsequence.

18. The system of claim 15, wherein each database stores the respective plurality of pre-generated embeddings in association with indices that specify the level of confidence of the database.

19. The system of claim 18, wherein the index specifies, for each of the respective plurality of pre-generated embeddings, (i) a network location of an electronic document that comprises a source subsequence based on which the pre-generated embeddings is generated, (ii) a location offset of the source subsequence within the electronic document, and (iii) a timestamp that the electronic document is last modified.

20. The system of claim 15, wherein the operations further comprise providing the augmented output sequence to a client device for presentation on a display of the client device.

* * * * *